United States Patent [19]

Schmid

[11] 4,445,522

[45] May 1, 1984

[54] APPARATUS FOR CLEANING LIQUID CONVEYING SYSTEM AND CONTROL VALVE ASSEMBLY THEREFOR

[75] Inventor: Rolyn A. Schmid, Hayward, Wis.

[73] Assignee: Bender Machine Works, Inc., Hayward, Wis.

[21] Appl. No.: 422,360

[22] Filed: Sep. 23, 1982

[51] Int. Cl.$^3$ .............................................. B08B 9/06
[52] U.S. Cl. .................................. 134/58 R; 134/171; 137/561 R
[58] Field of Search ............................ 134/56 R–58 R, 134/100–101, 166 R–168 R, 171; 137/561 R

[56] References Cited

U.S. PATENT DOCUMENTS

| | | | |
|---|---|---|---|
| 3,119,399 | 1/1964 | Bender | 134/56 R |
| 3,191,576 | 6/1965 | Bender | 134/168 R X |
| 3,732,891 | 5/1973 | Bender | 137/561 R |
| 3,921,652 | 11/1975 | Schmid | 134/58 R |
| 4,174,721 | 11/1979 | Wuchse | 134/58 R |
| 4,407,315 | 10/1983 | Haberer | 134/58 R |

Primary Examiner—Robert L. Bleutge
Attorney, Agent, or Firm—James E. Nilles

[57] ABSTRACT

Cleaning apparatus for a vacuum-operated milk conveying system in a dairy comprises a cleaning liquid tank, timer-controlled components which periodically supply fresh cleaning liquid to the tank, connections by which liquid in the tank (fresh or used) is periodically provided to the system, and a timer-controlled drain control valve assembly mounted on the tank. The valve assembly comprises two (upper and lower) symmetrical molded plastic valve housings secured on opposite sides of a horizontal plate having sets of holes therein which are cooperable with chambers, ports and openings in the housings. The valve assembly also comprises an inlet port, an outlet port, a circulating port, and a single solenoid for operating three rod-mounted valves, namely: a fill valve located between the inlet port and the circulating port, a dump valve located between the inlet port and the outlet port, and a drain valve for a drain port on the tank. When the solenoid is de-energized, the drain valve closes to allow the tank to fill and used cleaning liquid from the system is directed from the inlet port, through the fill valve and through the circulating port into the tank for recirculation. When the solenoid is de-energized, the drain valve opens to allow the tank to empty and used cleaning liquid from the system is directed from the inlet port, through the dump valve and through the outlet port for disposal elsewhere than into the tank.

11 Claims, 8 Drawing Figures

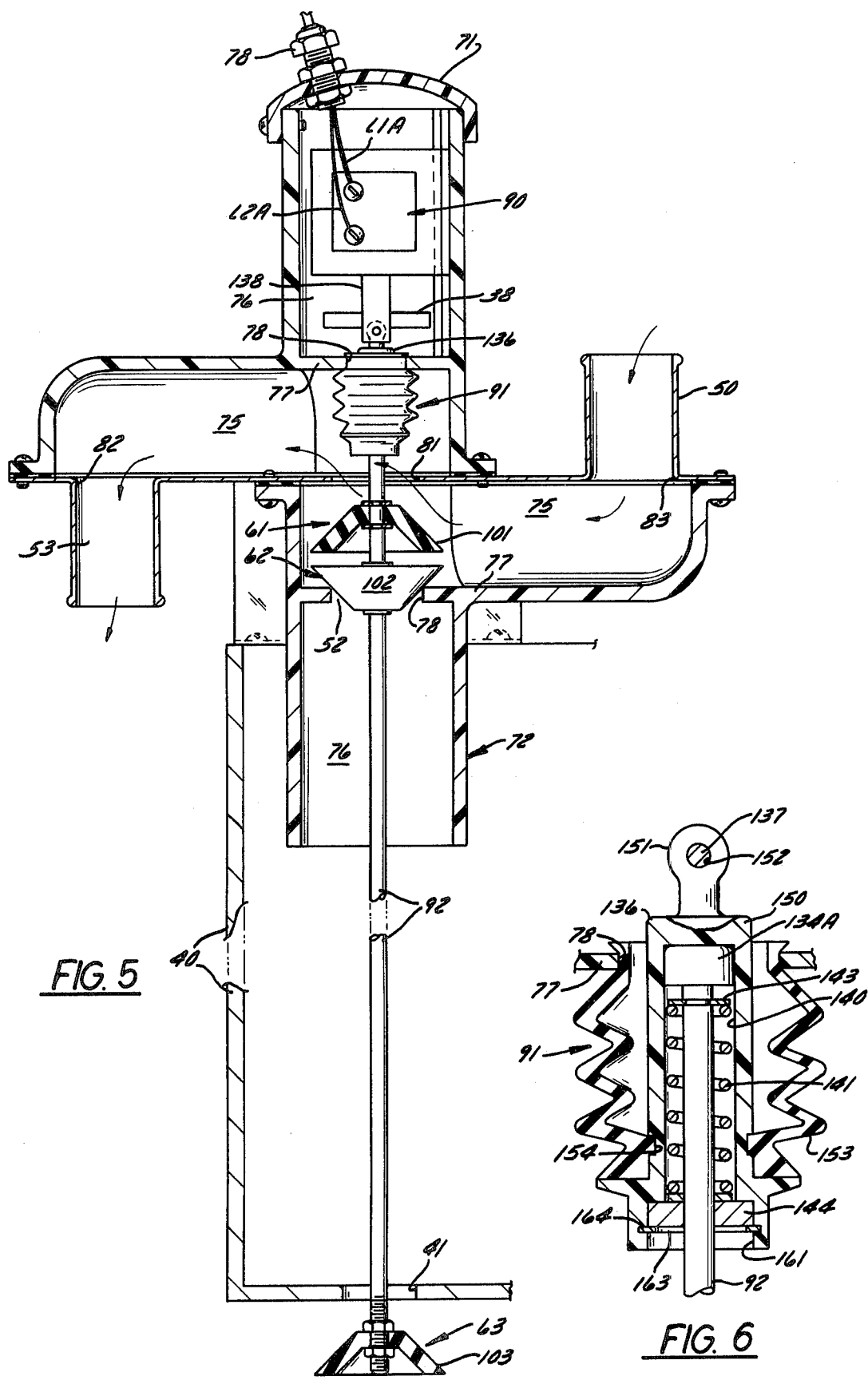

APPARATUS FOR CLEANING LIQUID CONVEYING SYSTEM AND CONTROL VALVE ASSEMBLY THEREFOR

BACKGROUND OF THE INVENTION

1. Field of Use

This invention relates generally to apparatus for automatically cleaning liquid conveying systems and to an improved control valve assembly in such apparatus. The invention is especially well-adapted for use in fluid conveying systems such as are used in dairies to convey milk from a milking parlor to a storage area.

2. Description of the Prior Art

Prior art liquid conveying systems used in dairies to convey milk from a milking parlor to a storage area typically comprise a pipeline to which teat claw assemblies for milking cows are connectable and the pipeline is connectable to a milk storage tank. Milk is moved through the teat claw assemblies, through the pipeline and into the milk storage tank by a vacuum which is maintained in the pipeline by means of a vacuum pump acting through a vacuum releaser which allows milk accumulating in the pipeline to be supplied to a milk storage tank. U.S. Pat. No. 3,191,576 discloses such a prior art system. Such systems must be cleaned after each milking operation. The prior art discloses various types of cleaning apparatus which are usable with such liquid conveying systems to periodically and repeatedly introduce cleaning liquids (in the form of cleaning solutions comprising mixtures of water and detergent and in the form of plain rinse water) into a cleaning liquid tank and from thence into the milk conveying systems in accordance with programs or cycles determined by a programmable timer. U.S. Pat. Nos. 3,191,576; 3,119,399; 3,921,652 and 3,732,891 illustrate various types of such prior art cleaning apparatus. The prior art cleaning apparatus has become increasingly more complex, costly, and trouble-prone, especially as regards the valves and valve controls required to control the flow of the cleaning solutions between the cleaning liquid tank and the milk conveying system. Furthermore, some types of prior art cleaning apparatus operate in such a manner that they are extremely wasteful of hot water and the relatively expensive detergents used to clean the liquid conveying system. For example, in some apparatus a batch of cleaning solution comprising hot water and detergent is used once on the initial cleaning cycle and must then be discarded because it is so contaminated with residual milk that it cannot be recirculated effectively. Accordingly, it is desirable to provide an improved cleaning apparatus and valve assembly therefor which overcomes these and other problems.

SUMMARY OF THE PRESENT INVENTION

In accordance with the invention, apparatus is provided for cleaning a vacuum-operated liquid conveying system such as is used in a dairy to convey milk through teat claw assemblies in a milking parlor and through a pipeline to a milk storage receptacle in a milk storage area. A motor-driven vacuum pump and a vacuum releaser maintain a vacuum in the system to convey the milk therethrough.

The cleaning apparatus comprises supply means for periodically supplying fresh cleaning liquid (either a cleaning solution comprising a mixture of water and detergent or clear rinse water) from a source. The supply means includes hot and cold water lines, solenoid operated hot and cold water supply valves for the water lines, and detergent supply pumps and valves. The cleaning apparatus also comprises a cleaning liquid tank to which said fresh cleaning liquid is supplied by the supply means, and such tank has a tank drain port. The cleaning apparatus also comprises delivery means, such as a hose connected between the tank and the system, for delivering cleaning liquid from the tank to the system under the force of the vacuum in the system. The cleaning apparatus also comprises control valve means which is selectively operable either to close the tank drain port (thus enabling the tank to be filled) and to direct used cleaning liquid from the system into the tank for recirculation or, in the alternative, to open the tank drain port to empty the tank and to dump used cleaning liquid from the system elsewhere than into the tank. The apparatus also comprises control means, including an adjustable timer means, which, in addition to periodically energizing the vacuum pump, also periodically energizes the solenoid valves and pumps in the cleaning liquid supply means and periodically operates the control valve means.

The control valve means or drain control valve assembly comprises an inlet port connectable to receive used cleaning liquid from the liquid conveying system, a circulating port for discharging used cleaning liquid from the inlet port into the tank, and a discharge port for discharging used cleaning liquid from the inlet port elsewhere than into said tank i.e., as into a floor drain in the dairy. The drain control valve assembly further comprises a first valve for connecting and disconnecting the inlet port and the discharge port; a second valve for connecting and disconnecting the inlet port and the circulating port; and a third valve for opening and closing the tank drain port. The drain control valve assembly also comprises a solenoid actuator energizable by the control unit to close the first and third valves and open the second valve, or alternately, to open the first and third valves and close the second valve.

The drain control valve assembly is located on the tank above the tank drain and comprises two symmetrical molded plastic valve housings secured on opposite sides of a horizontal plate which has three (first, second, third) plate holes therethrough. Each valve housing is open at opposite ends and includes two (inner and outer) chambers therein which are separated by a divider which has an internal opening or hole therethrough. The upper housing overlies the first and second plate holes and the lower housing overlies the first and third plate holes, so that the two internal openings and the first plate hole are in registry. The solenoid actuator is located in the outer chamber of the upper housing and is connected to and axially moves a linkage which is mounted in sealed relationship in the internal opening in the upper valve housing. The linkage, in turn, is connected to and axially moves a rod which extends through the first plate hole, through the internal opening in the lower valve housing, and through the tank drain port in the bottom of the tank. The rod carries three valve members which, when the solenoid is energized, close the first plate hole, open the internal opening in the lower valve housing, and close the tank drain opening. When the solenoid is deenergized, the three valve members open the first plate hole, close the internal opening in the lower valve housing, and open the tank drain opening.

The cleaning apparatus and control valve assembly therefor offer several advantages over the prior art. For example, the apparatus is simpler, more compact and less costly to manufacture and operate than the prior art. Connecting the cleaning apparatus for operation is easily accomplished merely by switching one flexible return line from the milk storage tank to the control valve assembly and opening a manual valve which connects the system pipeline to the liquid cleaner tank. The apparatus can be adjusted and programmed by means of the timer in the control unit to operate in a wide range of cycles.

The control valve assembly is mounted directly on the liquid cleaner tank and cooperates directly with the drain port therein. The control valve assembly is simple in construction, employs a minimum number of components, and is reliable in use. The control valve assembly employs two molded plastic housings which are identical to each other and, therefore, more economical to fabricate, and also employs a plurality of identical valve members. The control valve assembly employs only a single solenoid actuator to operate three different valves and thus effects a cost reduction. Other objects and advantages of the invention will hereinafter appear.

BRIEF DESCRIPTION OF THE DRAWINGS

FIG. 2 is an enlarged cross-section view of the drain control valve assembly of FIG. 1 taken on line 2—2 of FIG. 1 and showing it in energized condition;

FIG. 3 is a cross section view of a portion of the valve assembly of FIG. 2 and showing it in de-energized condition under one set of circumstances;

FIG. 4 is a cross-section view of a portion of the valve assembly taken on line 4—4 of FIG. 2;

FIG. 5 is a view similar to FIG. 3 but showing the valve assembly de-energized and under another set of circumstances;

FIG. 6 is an enlarged cross-section view of a linkage in the valve assembly of FIGS. 2, 3 and 5;

DESCRIPTION OF A PREFERRED EMBODIMENT

Figure 1:
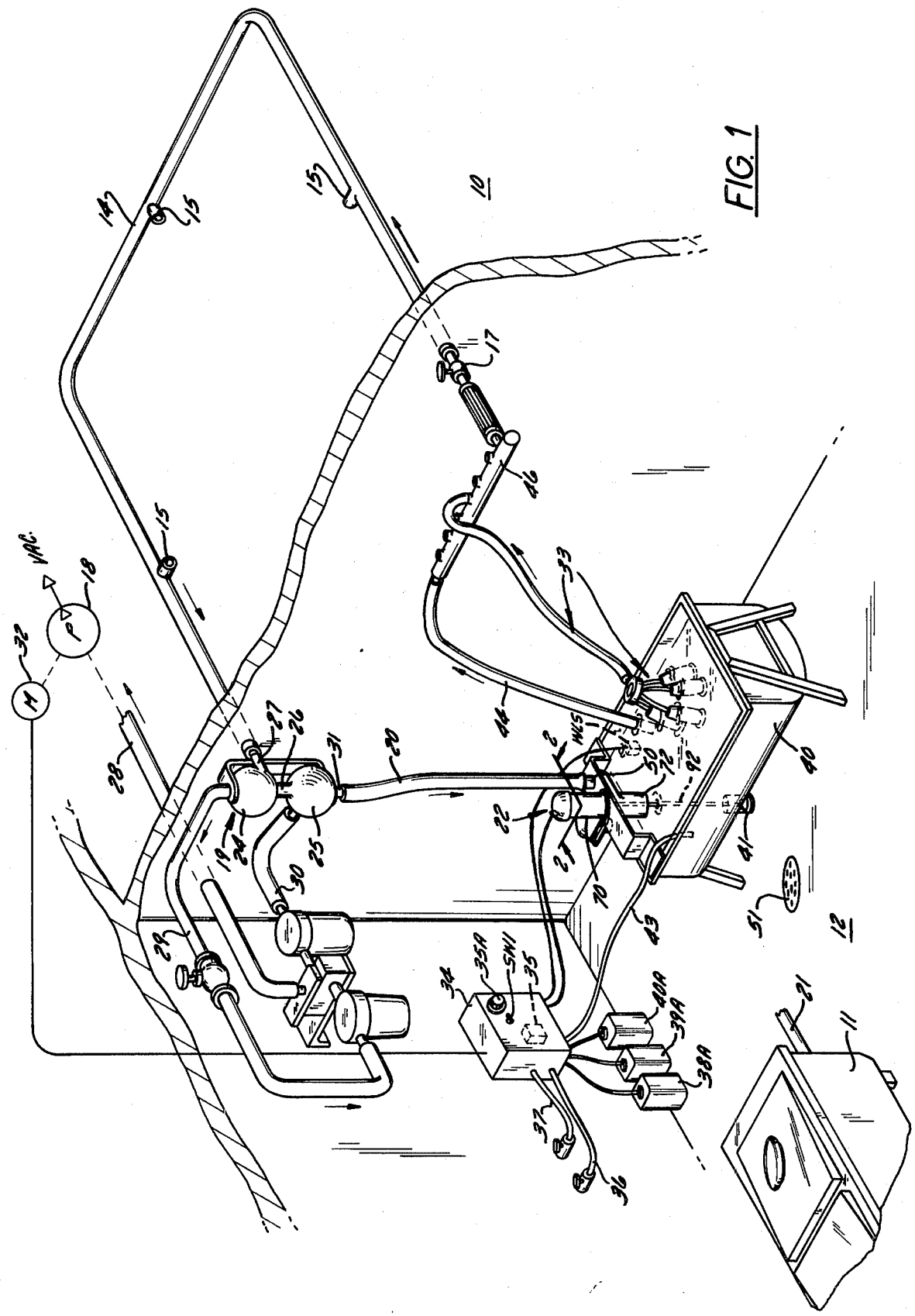
FIG. 1 is a perspective view of a portion of a vacuum-operated milk conveying pipeline in a dairy milking parlor employing automatic cleaning apparatus and a drain control valve assembly therefor in accordance with the present invention.

FIG. 1 shows a liquid conveying system which is connectable and operable in a milking mode for delivering milk from a milking parlor 10 to a milk storage vessel or receptacle 11 in a milk storage area 12. The system is also connectable and operable in a cleaning mode, as shown in FIG. 1, whereby cleaning apparatus in accordance with the invention and located in storage area 12 is connected and operated to clean the system by flushing it with cleaning liquids (in the form of a cleaning solution comprising a mixture of water and detergent and in the form of rinse water).

The liquid conveying system shown in FIG. 1 generally comprises: a pipeline 14 having a plurality of self-closing teat claw connection ports 15 therealong and a manually operable shut-off valve 17 at one end; vacuum producing means, including a conventional vacuum pump 18 driven by a motor 32 and a conventional vacuum releaser unit 19, at the other end of the pipeline; and a flexible fluid line 20 having one end connected to the vacuum releaser unit 19 and having its other end manually connectable either to an inlet pipe 21 on milk storage vessel 11 (when in the milking mode) or to an inlet port 50 of a drain control valve assembly 22 (when in the cleaning mode), as shown in FIG. 1. Vacuum releaser unit 19 comprises two separate vessels 24 and 25 which are connected together by a one-way check valve 26 located therebetween. Upper vessel 24 has a fluid inlet 27 to which an end of pipeline 14 is connected and is always subjected to a constant vacuum from conduit 28 when pump 18 is in operation, either directly through a conduit 29 or from the lower vessel 25 which is alternately subjected to vacuum via a conduit 30 or to atmosphere. Lower vessel 25, in which milk collects during the milking mode, has a fluid outlet 31 which is connected to flexible fluid line 20. U.S. Pat. No. 3,191,576 owned by the same assignee as the present application shows and describes in detail the construction and operation of a vacuum releaser unit such as 19. Energization of an electric motor 32 for vacuum pump 18 is controlled by an electric control unit 34, hereinafter described, which includes a timer 35 which turns pump 18 on and off in accordance with the timing sequence depicted in the timing chart shown in FIG. 8.

When the system is in the milking mode, valve 17 is closed, pipeline 14 is connected by line 20 to pipe 21 of the milk storage tank 11, at least one teat claw assembly such as 33 is connected to a port 15 in pipeline 14 and to a cow (not shown), control unit 34 is in operation, vacuum pump 18 is constantly energized, and milk is delivered to milk storage vessel 11.

When a milking operation is completed, the fluid conveying system, including pipeline 14, vacuum releaser unit 19, fluid line 20, and each teat claw assembly 33, is cleaned by repeatedly flushing with a cleaning liquid, such as a cleaning solution comprising water and detergent and with clear rinse water. In order to carry out a cleaning operation, the system must be placed in the cleaning mode and the cleaning apparatus must be connected thereto.

Figure 7:
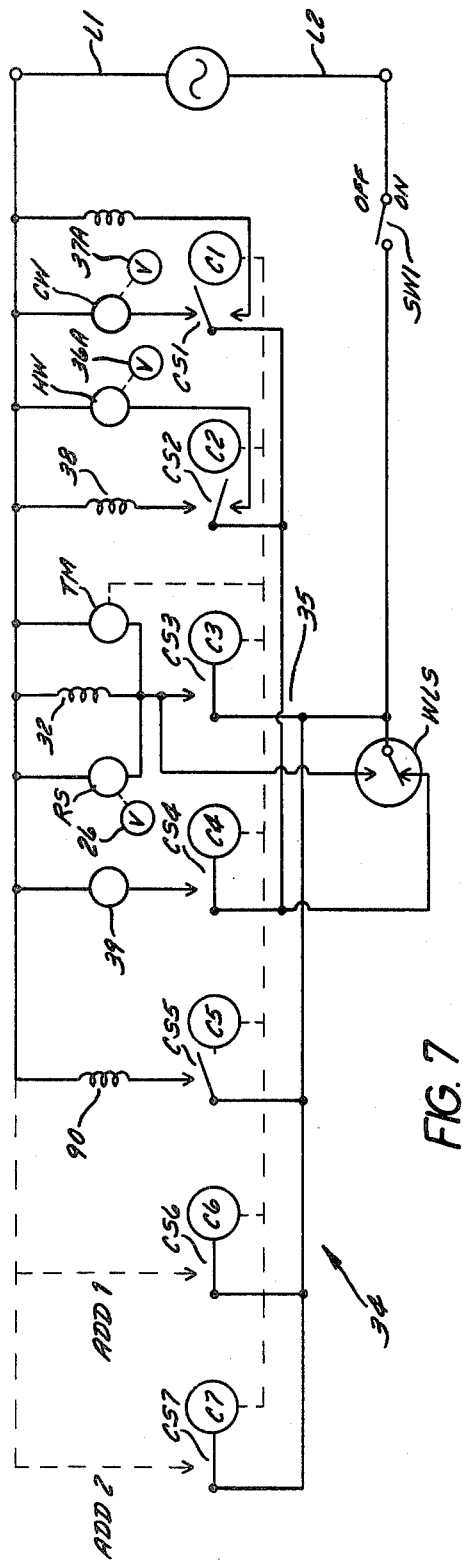
FIG. 7 is an electrical circuit diagram of a portion of the control system for the apparatus of FIG. 1.

As FIG. 1 shows, the cleaning apparatus generally comprises supply means for periodically supplying fresh cleaning liquid (either a cleaning solution comprising a mixture of water and detergent or clear rinse water) from a source. The supply means includes a hot water line 36 and a cold water line 37, solenoid-operated hot and cold water supply valves 36A and 37A for the water lines (see FIG. 7) and a detergent (sanitizer) and acid supply pumps (not shown) having motors 38 and 39 for feeding from the supply bottles 38A, 39A, 40A in FIG. 1. The pumps (not shown), motors 38 and 39, and solenoid valves 36A and 37A, as well as other components shown in FIG. 7, are understood to be located in control unit 34. The cleaning apparatus also comprises a cleaning liquid tank 40 to which said fresh cleaning liquid is supplied by the supply means through a supply line 43, and such tank has a tank drain port 41 in the bottom thereof. The cleaning apparatus also comprises delivery means, such as a delivery hose 44 connected between the tank 40 and a teat claw manifold 46 on pipeline 14 of the system, for delivering cleaning liquid from the tank to the system under the force of the vacuum in the system. The cleaning apparatus also comprises control valve means, including a drain control valve assembly 22, which is connected to flexible fluid line 20 (see FIG. 1). The apparatus also comprises a control unit 34, including an adjustable timer means 35, which, in addition to periodically operating the vacuum pump 18, also periodically operates the hereinbeforementioned solenoid valves and pumps in the cleaning liquid supply means and periodically operates the drain control valve assembly 22. Drain control valve assembly 22 is controlled by the control unit 34 and timer 35 so that it operates in either of two modes, namely, a fill mode and a dump mode. In the fill mode valve assembly 22 directs cleaning liquid from the return line 20 either into the tank 40 and closing the tank drain opening 41 whereby the cleaning liquid 40 can be recirculated. In the dump mode, valve assembly 22 directs the liquid to an outside floor drain 51 to dispose of the cleaning liquid from the system and opens the tank drain 41 to empty the tank 40 of the cleaning liquid therein.

Placement of the system in the cleaning mode is accomplished by connecting flexible fluid line 20 to drain valve control assembly 22, opening shut-off valve 17, connecting supply line 44 between the manifold 46 and cleaning liquid tank 40, and (if desired) attaching teat claw assembly 33 between manifold 46 and tank 40.

Figures 2, 3, 4:
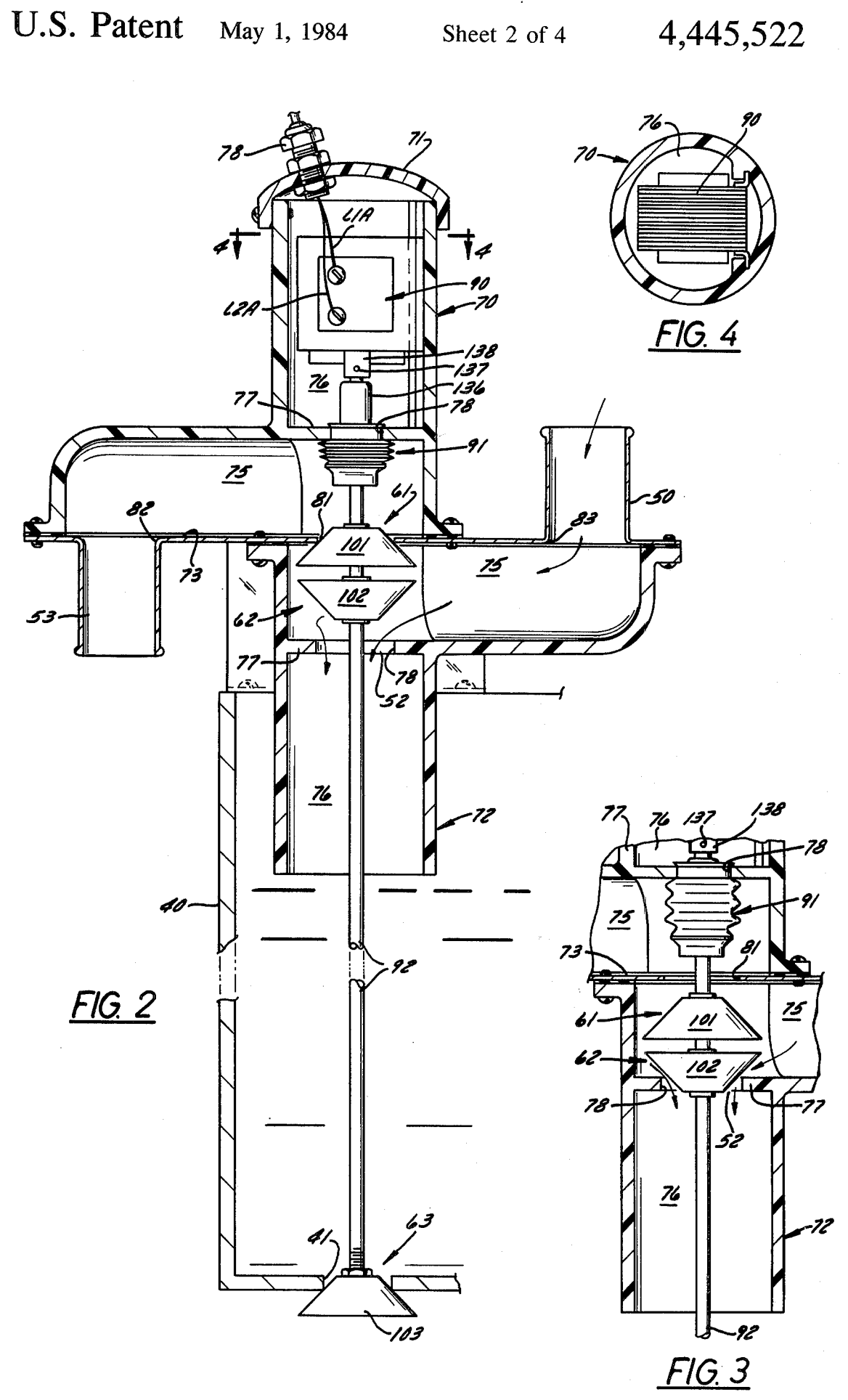

As FIG. 2 shows, drain control valve assembly 22 is mounted on tank 40 and operates in either of two modes, namely, a fill mode and a dump mode. In the fill mode the tank drain port 41 closes and used cleaning liquid from the system enters an inlet port 50 and is returned to the tank 40 through a circulating port 52 for recirculation. In the dump mode the tank drain port 41 is opened to empty the tank 40 and used liquid from the system enters the inlet port 50 and is dumped through a discharge port 53 elsewhere than in the tank, as into floor drain 49 shown in FIG. 1.

The drain control valve assembly 22 comprises three timer controlled solenoid actuated valves including a first valve 61 for connecting and disconnecting the inlet port 50 and the discharge port 53; a second valve 62 for connecting and disconnecting the inlet port 50 and the circulating port 52; and a third valve 63 for opening and closing the drain port 41 in tank 40. The control unit 34 closes the first valve 61 and third valve 63 and opens the second valve 62 (see FIG. 1) or, alternately, opens the first valve 61 and third valve 63 and closes the second valve 62 (see FIG. 5).

As FIG. 2 shows, the drain control valve assembly comprises upper and lower symmetrical and preferably identical molded plastic open-ended valve housings 70 and 72, respectively, which are secured on opposite sides of a horizontal plate 73 which has three (first, second, third) plate holes 81, 82, 83, respectively, therethrough. Each valve housing 70, 72 includes inner and outer chambers 75 and 76, respectively, separated by a divider 77 which has a divider hole 78 therethrough. The upper housing 70 overlies the first and second plate holes 81 and 82, respectively. The lower housing 72 overlies the first and third plate holes 81 and 83, respectively. The two divider holes 78 and the first plate hole 81 are in registry.

As FIGS. 2 and 4 show, a solenoid 90 is mounted in the upper outer chamber 76 of housing 70 and axially moves a linkage 91 (see FIGS. 2, 3, 5 and 6) which is mounted in sealed relationship in the upper divider hole 78 in upper housing 70. Housing 70 is provided with an end cap 71 to protect the solenoid 90 and the cap accomodates a bushing 78 for the wire leads L1A and L2A to the solenoid. Linkage 91, in turn, axially moves a rod 92 which extends through the first plate hole 81, through the hole 78 in the lower divider 77 and through the tank drain port 41. The rod 92 carries three frusto-conical resilient valve members 101, 102, 103 which, when the solenoid 90 is energized, close the first plate hole 81, open the internal opening 78 in the lower valve housing 72, and close the tank drain opening 41. When the solenoid 90 is de-energized, the three valve members 101, 102, 103 open the first plate hole 81, close the internal opening 78 in the lower valve housing 72, and open the tank drain opening 41.

As FIG. 6 shows, the linkage 91 comprises a bushing member 136 having its upper end connected by a pin 137 to the solenoid armature 138 and having a bore 140 therein in which the upper end of the shaft or rod 92 is slidably received, and a compression spring 141 disposed around the rod or shaft 92 within the bore 140 and entrapped between a projection or snap ring 143 on the end of shaft 92 and an axial stop 144 on the lower end of the bushing member 136.

More specifically, bushing member 136, which is fabricated of plastic, takes the form of a hollow cylindrical member into which bore 140 extends from the bottom end and which is closed by an upper wall 150 to which an attachment fitting 151 is integrally formed. Fitting 151 includes a hole 152 for accomodating solenoid attachment pin 137. Bushing member 136 is provided with a compressible bellows 153 which is secured between the lower exterior of the bushing member, as by engaging groove 154, and the edge of hole 78 in the divider 77 inside upper housing 70. As FIG. 2 shows, opening 78 communicates between chambers 75 and 76 in housing 70 and bellows 153 serves as a protective seal against liquid flow through hole 78 when the valve 61 is open. The axial stop 144 at the lower end of bushing member 136 takes the form of a washer which is disposed in an enlarged opening or recess 161 communicating with bore 140. The washer is held in place by a conventional snap ring 163 which engages an annular groove 164 in recess 161.

As FIGS. 3 and 5 show, when the valve member 102 is seated and the solenoid 90 is de-energized, the armature 138 is fully extended and the rubber cushion 134A bears against the upper end wall 150 of the bore 140 of the bushing member 136.

As FIG. 2 shows, when the solenoid 90 is energized, the armature 138 begins to be retracted and the bushing member 136 is raised causing the spring 141 to become fully compressed against the projection 143 at the top end of the shaft 92.

As FIG. 2 shows, when the armature 38 is fully retracted, it raises the shaft 92 and the valve members 101 and 103 are seated and the stored energy in the spring 141 acts to further raise the shaft and the valve members thereon with a snap action.

When the solenoid is again de-energized, the armature 138 descends thereby allowing the valve 102 to reseat itself in the orifice 78 under the force of gravity. The above process is automatically repeated throughout the washing and rinsing cycles.

As comparison of FIGS. 3 and 5 make clear, when valve 62 assumes the closed position, the valve member 102 thereof seats in hole 78 in lower housing 72 under the force of gravity. If, as shown in FIG. 5, there is a full surge of liquid flow between inlet port 50 and outlet port 53 through opening 81, such flow has the effect of causing valve member 102 to be positively seated under pressure in hole 78. On the other hand, as FIG. 3 shows, the valve member 102 is held open by a small amount of spring bias from spring 141 and only full flow of water will cause valve member 102 to seat. This is sufficient to allow water drainage through hole 78.

As FIG. 7 shows, control unit 34 includes the timer 35 which is connected to energize various solenoids and motors, as hereinafter explained, and is itself energizable by conductor wires L1 and L2 which are connected to a suitable source of electric power such as a 120 volt AC 60 Hz power supply through an SPST on-off switch SWI. Timer 35 may take the form of an automatic timer having a control knob 35A (see FIG. 1) for adjusting the on cycles and off cycles, respectively, of various components as operation of the apparatus requires. Such a timer may be similar to that shown in U.S. Pat. No. 3,921,652, FIG. 9, Item K, manufactured by Mallory Timers Co., Indianapolis, Ind., Model M 300, contacts 15A. 125 V AC, $\frac{1}{2}$ H. P. The several solenoids, for example, are rated at 120 V 60 Hz $\frac{1}{2}$ amp and are available from the Singer Control Company of America.

Figure 8:
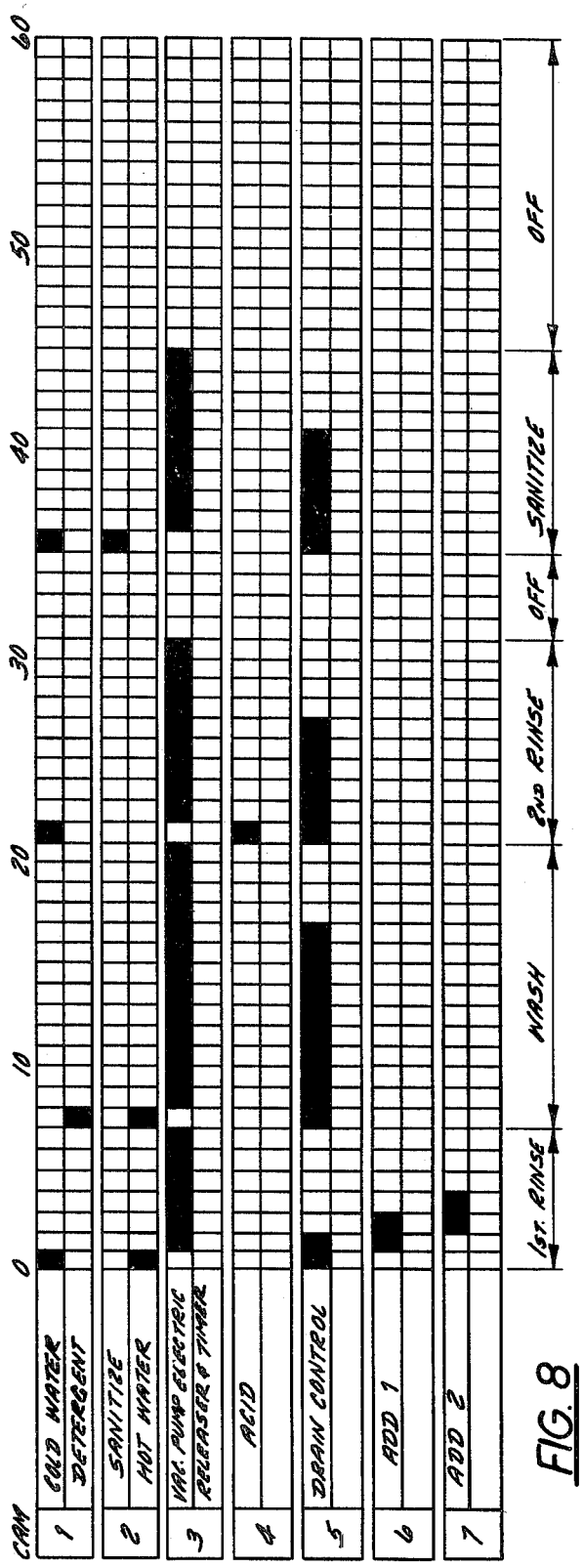
FIG. 8 is a timing chart for the apparatus components shown in FIG. 7.

Timer 35 shown in FIG. 7 includes seven adjustable cams C1 through C7, seven cam-operated switches CS1 through CS7, and a timer motor TM to drive the cams and operate their cam-operated switches. Energization of timer motor TM, energization of vacuum pump motor 32 (see FIGS. 1 and 7), and energization of an electric releaser solenoid ERS are controlled directly and simultaneously by a SPDT water level switch WLS which is located in cleaning liquid tank 40 (see FIGS. 1 and 7). The Table I below identifies each cam, its cam-operated switch, and the component it controls and the chart in FIG. 8 shows a typical timing cycle.

TABLE I

| CAM | SWITCH | TYPE | CONTROLS |
| --- | --- | --- | --- |
| Cam C1 | Switch CS1 | (SPDT) | Cold water valve solenoid CWS, Detergent pump motor DM |
| Cam C2 | Switch CS2 | (SPDT) | Hot water valve solenoid HWS, Sanitizer Motor SM |
| Cam C3 | Switch CS3 | (SPST) | Releaser solenoid RS, Timer motor TM, Vacuum pump motor 32, all energized when water level switch WLS senses low water and C3 maintains |
| Cam C4 | Switch CS4 | (SPST) | Acid pump motor APM |
| Cam C5 | Switch CS5 | (SPST) | Drain control valve solenoid 90 |
| Cam C6 | Switch CS6 | (SPST) | Additional (repeat) operation of part of cycle of Cam C1 |
| Cam C7 | Switch CS7 | (SPST) | Additional (repeat) operation of part of cycle of Cam C2 |

Operation

The cleaning apparatus and control valve means therefor operate in the following manner when the liquid conveying system is placed in the cleaning mode as shown in FIG. 1 and a cleaning cycle as shown in FIG. 8 is to be carried out.

Initially assume that tank 40 is empty and that switch SWI is turned "on" to energize the control unit. Since tank 40 is empty, water level switch WLS is in the first condition shown in FIG. 7 and this causes the hot and cold water solenoids HW and CW to be energized and open the water valves 36A and 37A and supply water to tank 40. Drain control assembly solenoid 90 also energizes to operate valve 63 and close tank drain 41, to open valve 62 and to close valve 61 in the drain control valve assembly 22. When water level switch WLS senses that a certain amount of water is in tank 40, it assumes a second condition wherein it shuts off the water flow and turns on the timer motor TM to start timer 35, turns on the vacuum pump motor 32 to vacuumize the pipeline 15, and opens the releaser valve 26 to enable return flow from releaser 19 through line 20. As the timer 35 commences operation, its seven cams C1 through C7 rotate to carry out the operations shown in FIG. 7. More specifically, the water supply to tank 41 shuts off, clear water in tank 41 is drawn upward through line 44 (and through teat claw 33), through pipeline 14, through open releaser valve 26, through lower vessel 25 of releaser 19, and down through return line 20. Since valve 62 in drain control valve assembly 22 is open, tank 40 fills with used rinse water. However, as soon as solenoid 90 is de-energized by the timer 35, its valve 62 closes and its valves 61 and 62 open so that water from line 20 and from tank 40 is dumped. In this manner a first rinse is carried out.

As timer 35 continues to operate, solenoid 90 is reenergized after a period of time and drain valve 63 re-closes, valve 62 re-opens and valve 61 re-closes to allow refill of tank 40 with both hot water and detergent. This wash solution is recirculated for a period of time between the tank 40 and the system and eventually is dumped when solenoid 90 is again de-energized.

As timer 35 continues operation the remaining cycles are carried out, namely: "end rinse," "off," "sanitize," and final "off" in a manner similar to that hereinbefore described.

I claim:
1. Apparatus for cleaning a liquid conveying system comprising:
  a tank having a tank drain port;
  supply means for periodically supplying fresh cleaning liquid from a source to said tank;
  delivery means for delivering cleaning liquid from said tank to said system;
  and control valve means on said tank for receiving used cleaning liquid returning from said system and operable for closing said tank drain port and directing used cleaning liquid from said system into said tank whereby the used cleaning liquid is available for recirculation and, alternatively, for opening said tank drain port to empty said tank and directing used cleaning liquid from said system elsewhere than into said tank.

2. Apparatus according to claim 1 further including control means including timing means for effecting timed operation of said supply means, of said delivery means, and of said control valve means.

3. Apparatus according to claim 1 or 2 wherein said control valve means comprises an inlet port connectable to receive used liquid from said liquid conveying system, a circulating port for delivering used liquid from said inlet port to said tank, a discharge port for discharging used liquid from said inlet port elsewhere than into said tank, a first valve for controlling flow between said inlet port and said discharge port, a second valve for controlling flow between said inlet port and said circulating port, a third valve for controlling flow from said tank through said tank drain port, and valve actuator means for said first, second and third valves.

4. Apparatus according to claim 3 wherein said valve actuator means comprises a solenoid operated by said control means.

5. Apparatus for cleaning a liquid conveying system comprising:

a source of fresh cleaning liquid;

a tank having a tank drain port for discharging cleaning liquid from said tank;

supply means operable to supply fresh cleaning liquid from said source to said tank;

delivery means operable to deliver cleaning liquid from said tank to said system;

return means operable to return used cleaning liquid from said system;

control valve means comprising an inlet port connected to said return means to receive used cleaning solution from said system, a circulating port for discharging used cleaning solution from said inlet port into said tank, a discharge port for discharging used cleaning solution from said inlet port elsewhere than into said tank, a first valve for connecting and disconnecting said inlet port and said discharge port, a second valve for connecting and disconnecting said inlet port and said circulating port, a third valve for opening and closing said tank drain port, and an actuator to effect close of said first and third valves and open said second valve and alternately to open said first and third valves and close said second valve;

and control means including timer means to effect operation of said supply means, said delivery means, and said actuator drain control valve assembly.

6. In a valve assembly:

a member having first, second and third holes therethrough;

and a pair of housings located on opposite sides of said member;

each housing having a chamber therein and an end opening at least at one end of said housing communicating with said chamber;

each housing further comprising divider means therewithin for dividing said chamber into two sections, including an inner section and an outer section, said divider means including an internal opening therethrough affording communication between said two sections of said chamber;

one of said housings being positioned so that its end opening overlies said first and second holes in said member and its internal opening registers with said first opening;

the other of said housing being positioned so that its end opening overlies said first and third holes in said member and its internal opening registers with said first opening.

7. A valve assembly according to claim 6 further including:

a first valve member movably associated with said first hole in said member, a second valve member movably associated with the internal opening in one of said housings;

and means movably associated with and extending through the internal opening in the other of said housings and operatively connected to said first and second valve members.

8. A valve assembly according to claim 6 or 7 wherein each housing has end openings at opposite ends thereof and further including: a first valve actuator device located in the outer chamber section of said other housing and connected to said means in the internal opening in said other housing;

and a second valve actuator device located in the outer chamber section of said one housing and connected to said second valve member.

9. A valve assembly according to claim 8 wherein said first valve actuator is a solenoid and wherein second valve actuator device is a mechanical linkage connectable to a third valve member remote from said one housing.

10. In a valve assembly:

a plate member having first, second and third holes therethrough;

upper and lower valve housings mounted on opposite sides of said plate member;

each housing having a chamber therein and end openings at opposite ends of said housing communicating with said chamber;

each housing further comprising divider means therewithin for dividing said chamber into inner and outer chamber sections, said divider means including an internal opening therethrough affording communication between the two chamber sections;

said upper housing being positioned so that an end opening thereof overlies the first and second holes in said plate member and its internal openings registers with said first opening;

a first valve actuator device located in the outer chamber section of said upper valve housing;

a linkage connected to said actuator device and located in the internal opening in said upper housing;

a rod connected to said linkage and extending through said first plate opening and through said internal opening in said lower valve housing;

a first valve member on said rod and movably associated with said first hole in said plate member;

a second valve member on said rod and movably associated with said internal opening in said lower valve housing;

and a third valve member located on said rod and remote from said lower valve housing.

11. As an article of manufacture:

a valve housing for disposition on one side of a member having three holes therethrough and for cooperation with a similar valve housing on the opposite side of said member;

said valve housing having a chamber therein and an end opening at least at one end of said housing communicating with said chamber;

said housing further comprising divider means therewithin for dividing said chamber into two sections, said divider means including an internal opening therethrough affording communication between said two sections of said chamber;

said housing when in use being positioned so that its said end opening overlies two of said holes in said member and its internal opening registers with one of said openings.

* * * * *